United States Patent
Chan et al.

(10) Patent No.: US 9,192,278 B2
(45) Date of Patent: Nov. 24, 2015

(54) SELF-CLEANING SUBSTRATE

(71) Applicant: Elwha LLC, Bellevue, WA (US)

(72) Inventors: Alistair K. Chan, Bainbridge Island, WA (US); William D. Duncan, Kirkland, WA (US); Roderick A. Hyde, Redmond, WA (US); Jordin T. Kare, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 136 days.

(21) Appl. No.: 14/042,374

(22) Filed: Sep. 30, 2013

(65) Prior Publication Data

US 2015/0089754 A1    Apr. 2, 2015

(51) Int. Cl.
*B08B 7/02* (2006.01)
*A47L 13/40* (2006.01)
*B08B 7/00* (2006.01)
*B08B 17/02* (2006.01)
*G02B 27/00* (2006.01)

(52) U.S. Cl.
CPC . *A47L 13/40* (2013.01); *B08B 7/00* (2013.01); *B08B 7/028* (2013.01); *B08B 17/02* (2013.01); *G02B 27/0006* (2013.01)

(58) Field of Classification Search
CPC ...... B08B 7/02; B08B 7/0035; B08B 7/0057; B08B 7/00; B08B 7/028; B08B 17/02; G02B 27/0006; A47L 13/40
See application file for complete search history.

(56) References Cited

U.S. PATENT DOCUMENTS

| | | |
|---|---|---|
| 4,120,699 A | 10/1978 | Kennedy et al. |
| 4,720,621 A | 1/1988 | Langen |
| 5,037,189 A | 8/1991 | Fujie et al. |
| 5,388,304 A | 2/1995 | Takada |
| 5,683,556 A | 11/1997 | Nomura et al. |
| 5,895,632 A | 4/1999 | Nomura et al. |
| 6,076,216 A | 6/2000 | Biryukov |
| 6,911,593 B2 | 6/2005 | Mazumder et al. |
| 7,052,531 B2 | 5/2006 | Kishioka |
| 7,276,127 B2 | 10/2007 | Dube et al. |
| 7,325,931 B2 | 2/2008 | Ikeda et al. |

(Continued)

FOREIGN PATENT DOCUMENTS

| | | |
|---|---|---|
| JP | 11-128859 A | 5/1999 |
| JP | 2005-279620 A | 10/2005 |
| WO | WO 2012/147050 A1 | 11/2012 |

OTHER PUBLICATIONS

PCT International Search Report; International App. No. PCT/US2014/058223; Jan. 12, 2015; pp. 1-4.

(Continued)

*Primary Examiner* — Shay Karls
(74) *Attorney, Agent, or Firm* — Foley & Lardner LLP

(57) ABSTRACT

Provided is a self-cleaning substrate system. The system includes a substrate and a cleaner coupled to the substrate, wherein the cleaner includes at least one of an electrode, an ultrasound emitter, or a coronal wind generator. The system includes a circuit configured to determine a characteristic of the substrate. The system further includes a power source. The system includes a controller operatively coupled to the cleaner, the sensor, and the power source. The circuit provides a feedback signal indicative of the detected characteristic to the controller, and wherein the controller is coupled to the cleaner such that the cleaner can be controlled by the controller.

34 Claims, 12 Drawing Sheets

(56) References Cited

U.S. PATENT DOCUMENTS

| | | |
|---|---|---|
| 7,684,938 B1 | 3/2010 | Feller |
| 7,948,552 B2 | 5/2011 | Noto |
| RE42,420 E | 6/2011 | Mitsumori et al. |
| 8,009,405 B2 | 8/2011 | Gefter et al. |
| 2003/0053643 A1 | 3/2003 | Bank et al. |
| 2003/0147159 A1 | 8/2003 | Dube et al. |
| 2004/0018768 A1 | 1/2004 | Lee |
| 2004/0079233 A1 | 4/2004 | Lau et al. |
| 2005/0061344 A1 | 3/2005 | Taylor et al. |
| 2005/0164169 A1 | 7/2005 | Malak |
| 2008/0023202 A1 | 1/2008 | Keatch et al. |
| 2009/0060780 A1 | 3/2009 | Walter et al. |
| 2011/0069220 A1 | 3/2011 | Field |
| 2011/0283477 A1 | 11/2011 | Ashpis |

OTHER PUBLICATIONS

Kolomenskii et al., "Interaction of laser-generated surface acoustic pulses with fine particles: Surface cleaning and adhesion studies", Journal of Applied Physics, vol. 84, No. 5, Sep. 1, 1998, 7 pages.

Liu et al, "Particle Transport by Standing Waves on an Electric Curtain", Journal of Electronics, Aug. 2010, vol. 68, pp. 289-298. 19 pages.

Biris et al, "Electrodynamic Removal of Contaminant Particles and its Applications" University of Arkansas at Little Rock, Applied Science Department; Industry Applications Conference 2004. 4 pages.

SELF-CLEANING SUBSTRATE

BACKGROUND

It is often desirable to keep substrate surfaces clear of dust, dirt, and other debris. The dust, dirt, and other debris may reduce transparency of the substrate, which may negatively impact performance. For example, it is undesirable to have dust and debris settle on a glass substrate used as a window or as part of an electronic display device, as the dust may hamper a person's view through the glass substrate. As an additional example, dust settling on the surface of a solar panel may block solar rays, and thus reduce the energy generating efficiency of the solar panel.

Cleaning substrate surfaces can also be a time consuming and expensive task. Cleaning large surfaces, such as the windows of a tall sky scraper, not only requires special chemicals and expensive equipment, but requires many hours of manual labor. The expense of cleaning substrate surfaces is further increased if the surface is prone to exposure to dust and debris because of cleanings.

SUMMARY

One embodiment relates to a self-cleaning substrate system. The system includes a substrate. The system further includes a cleaner coupled to the substrate, wherein the cleaner includes at least one of an electrode, an ultrasound emitter, or a coronal wind generator. The system includes a circuit configured to determine a characteristic of the substrate. The system further includes a power source. The system includes a controller operatively coupled to the cleaner, the sensor, and the power source. The circuit provides a feedback signal indicative of the detected characteristic to the controller, and wherein the controller is coupled to the cleaner such that the cleaner can be controlled by the controller.

Another embodiment relates to a self-cleaning substrate system. The system includes a substrate. The system further includes a plurality of electrodes coupled to the substrate, wherein the electrodes are configured to emit localized electric fields when activated. The system includes a circuit configured to determine a characteristic of the substrate. The system further includes a power source. The system includes a controller operatively coupled to the plurality of electrodes, the circuit, and the power source. The circuit provides a feedback signal indicative of the detected characteristic to the controller. The controller is coupled to each of the plurality of electrodes and is configured to individually activate and deactivate the electrodes based on the feedback signal to selectively clean a localized area of the substrate.

Yet another embodiment relates to a self-cleaning substrate system. The system includes a substrate. The system further includes a plurality of ultrasound emitters coupled to the substrate, wherein the ultrasound emitters are arranged in an array along the substrate. The system includes a circuit configured to determine a characteristic of the substrate. The system further includes a power source. The system includes a controller operatively coupled to the plurality of ultrasound emitters mechanisms, the circuit, and the power source. The circuit provides a feedback signal indicative of the detected characteristic to the controller. The controller is coupled to each of the plurality of ultrasound emitters and is configured to individually activate and deactivate the ultrasound emitters based on the feedback signal to selectively clean a localized area of the substrate.

Still another embodiment relates to a self-cleaning substrate system. The system includes a substrate. The system further includes a frame surrounding a periphery of the substrate. The system includes an ultrasound emitter coupled to the frame, wherein the ultrasound emitter is configured to emit ultrasonic waves into the substrate. The system further includes a circuit configured to determine a characteristic of the substrate. The system includes a power source. The system further includes a controller operatively coupled to the ultrasound emitter, the circuit, and the power source. The circuit provides a feedback signal indicative of the detected characteristic to the controller. The controller is configured to activate and deactivate the ultrasound emitter based on the feedback signal to selectively clean an area of the substrate.

An embodiment relates to a self-cleaning substrate system. The system includes a substrate. The system further includes a coronal wind generator coupled to the substrate, wherein the coronal wind generator is configured to cause a stream of air to be blown across a surface of the substrate when the coronal wind generator is activated. The system includes a circuit configured to determine a characteristic of the substrate. The system further includes a power source. The system includes a controller operatively coupled to the coronal wind generator, the circuit, and the power source. The circuit provides a feedback signal indicative of the detected characteristic to the controller. The controller is configured to activate the coronal wind generator based on the feedback signal to selectively clean an area of the substrate.

Yet another embodiment relates to a self-cleaning substrate system. The system includes a substrate. The system further includes a plurality of cleaners configured to clean the substrate, wherein the plurality of cleaners include at least two types of cleaners selected from the group of electrodes, ultrasound emitters, and coronal wind generators. The system includes a circuit configured to detect a characteristic of the substrate. The system further includes a power source. The system includes a controller operatively coupled to the plurality of cleaners, the circuit, and the power source. The circuit provides a feedback signal indicative of the detected characteristic to the controller, and wherein the controller is coupled to each of the plurality of cleaners such that each of the plurality of cleaners can be individually controlled by the controller.

Another embodiment relates to a method of cleaning a substrate with a substrate cleaning system, the substrate cleaning system including a controller, a determination circuit coupled to the controller, and a cleaning mechanism coupled to the controller. The method includes receiving operating instructions at the controller, wherein the operating instructions include an indication of a trigger event relating to a characteristic of the substrate. The method further includes determining the trigger event via the determination circuit. The method includes activating, the cleaning mechanism with the controller. The method further includes cleaning a localized area of the substrate with the cleaning mechanism.

An embodiment relates to a method of cleaning a substrate with a substrate cleaning system, the substrate cleaning system including a controller and a cleaning mechanism coupled to the controller. The method includes receiving a command to clean the substrate at the controller, wherein the command includes a location of a localized area of the substrate. The method further includes activating, by the controller, the cleaning mechanism. The method includes cleaning the localized area of the substrate through the cleaning mechanism. The method further includes determining a characteristic of the substrate during the cleaning step. The method includes deactivating the cleaning mechanism when the detected characteristic falls below a threshold level.

Another embodiment relates to a method of cleaning an electronic display having a display cleaning system, the display cleaning system including a controller and a cleaning mechanism coupled to the controller. The method includes receiving operating instructions at the controller, wherein the operating instructions include a cleaning command. The method further includes analyzing the cleaning command to determine a trigger event. The method includes determining the trigger event at the controller. The method further includes activating, by the controller, the cleaning mechanism. The method includes cleaning a localized area of the display through the cleaning mechanism.

DETAILED DESCRIPTION

Figure 1:
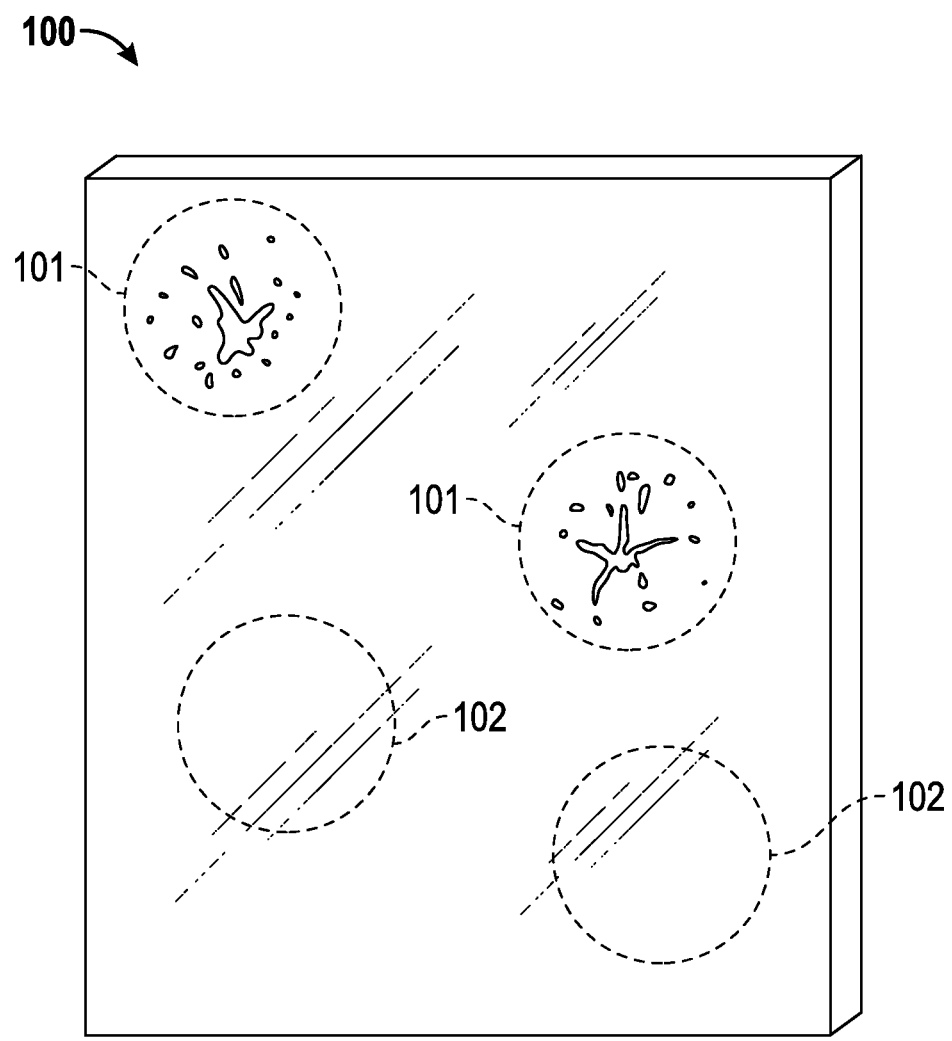
FIG. 1 is a view of a substrate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, a view of substrate 100 is shown according to an embodiment. Substrate 100 may be glass, metal, wood, or any other material. In some arrangements, substrate 100 is optically transmissive and/or transparent (e.g., glass, polycarbonate, transparent ceramics, quartz, plastics, etc.). Substrate 100 includes dusty and/or dirty areas 101. The dust and dirt may settle in areas 101 naturally over time (e.g., dust collecting on a window). Substrate 100 also includes clean areas 102.

Figure 2:
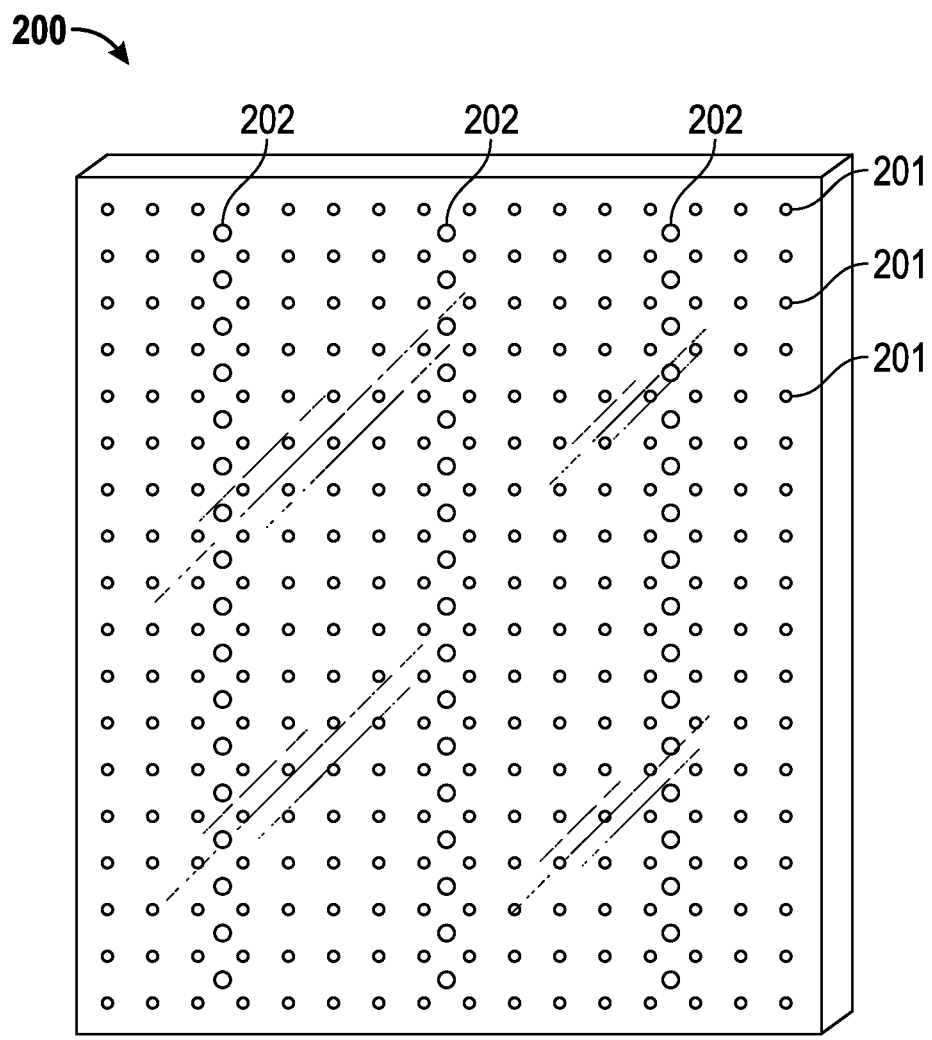
FIG. 2 is a view of a self-cleaning substrate according to an embodiment.

Referring to FIG. 2, a view of self-cleaning substrate 200 is shown according to an embodiment. Substrate 200 is similar to substrate 100. Substrate 200 may be glass, metal, wood, or any other material. In some arrangements, substrate 200 is optically transmissive and/or transparent (e.g., glass, polycarbonate, transparent ceramics, quartz, plastics, etc.). Substrate 200 includes an array of electrodes 201. Electrodes 201 may be nano-electrodes or micro-electrodes such that electrodes 201 do not substantially affect the transmissiveness or transparency of substrate 200. Electrodes 201 are alternating current electrodes or direct current electrodes. Electrodes 201 are embedded in substrate 200 such that electrodes do not protrude from a surface of substrate 200 such that the surface of substrate 200 is smooth. In an alternative arrangement, electrodes 201 are placed on a surface of substrate 200 (e.g., the front surface or rear surface of substrate 200). In yet another alternative arrangement, electrodes may be positioned about the periphery or perimeter of substrate 200 (e.g., on a frame surrounding substrate 200 or coupled to or embedded in substrate 200 around the periphery of substrate 200).

When a high-voltage current passes through any of electrodes 201, the powered electrode will emit localized electric fields. The electric fields emitted by electrodes 201 create localized charge areas such that objects on a surface of substrate 200 (e.g., dust or dirt) are repelled away from substrate. The forces generated by the electric field on the dust, dirt, or other particles exceed the forces of adhesion between the particles and substrate 200. Accordingly, it is possible to clean the surface of substrate 200 through selective activation and deactivation of the array of electrodes 201, which repels dust, dirt, and other particles off of and away from substrate 200.

The self-cleaning system includes a determination circuit to determine a characteristic of the substrate. The determination circuit may be part of a processor or controller. The determining circuit may determine substrate characteristics based on usage of the substrate. The determination circuit may comprise one or more sensors 202. Sensors 202 detect the presence and amount of dust, dirt, and other objects on the surface of substrate 200. Sensors 202 may be optical sensors configured to measure variances in the optical throughput of substrate 200, wherein the variances may correlate to a dirtiness level of substrate 200 (i.e., as substrate 200 becomes dirtier, it becomes less transparent or transmissive). For example, when dust or dirt accumulates on a surface of substrate 200, the optical transmissiveness or transparency of substrate 200 will be reduced. Sensors 202 detect this reduction. In an alternative arrangement, sensors 202 are resistance sensors configured to detect changes in a level of electrical resistance of substrate 200 caused by the buildup of dust, dirt, and other objects on the surface of substrate 200. Sensors 202 are embedded within substrate 200. Alternatively, sensors 202 are coupled to the surface of substrate 200. Sensors 202 may be arranged in an array. Alternatively, a single sensor is capable of detecting site-specific (i.e., at a specific location on the surface of substrate 200) dust, dirt, and other object accumulation on the surface of substrate 200. In yet another alternative configuration, sensors are arranged around the periphery of substrate 200. Sensors 202 provide feedback signals indicative of the detected characteristics and the locations of the detected characteristics to controller 300 (as discussed below with respect to FIG. 3), such that controller 300 can instruct site specific cleaning operations based on detected levels of dirtiness.

Figure 3:
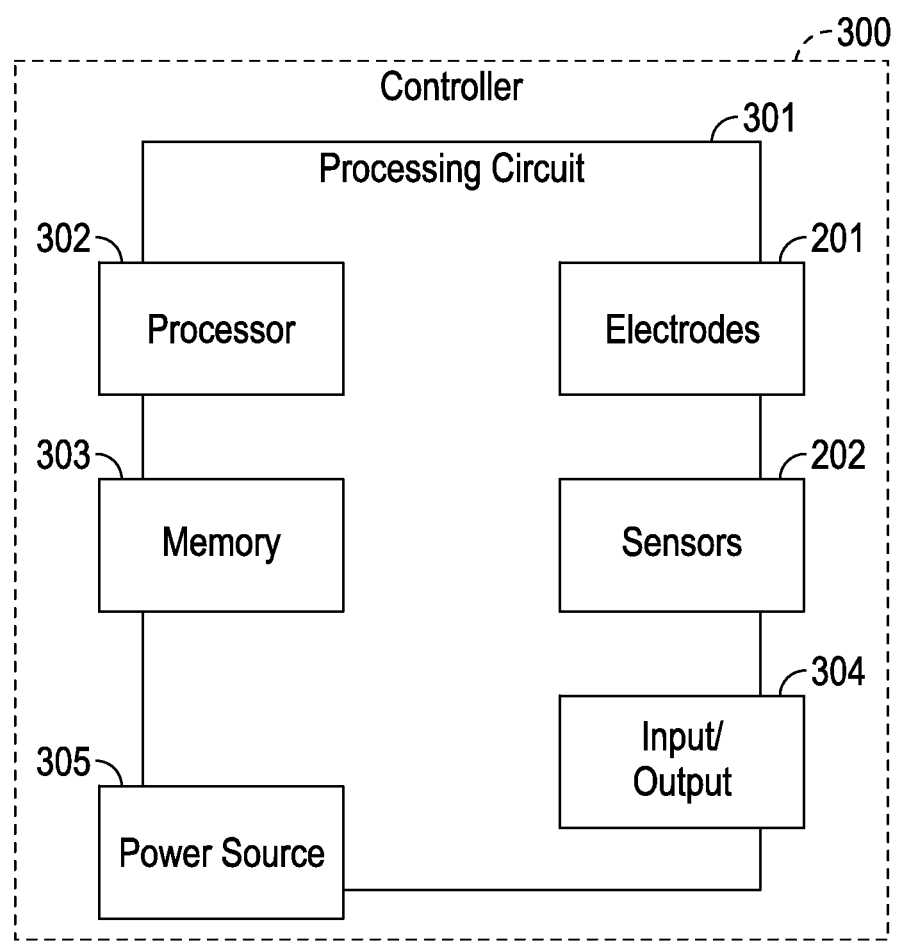
FIG. 3 is a block diagram of a controller for a self-cleaning substrate system.

Referring to FIG. 3, a block diagram of controller 300 is shown according to an embodiment. Controller 300 controls the array of electrodes 201 and any emitted electric field by selectively activating, deactivating, adjusting voltage, and adjusting current (e.g., adjusts voltage or current magnitude, switches current polarity, switches between alternating current and direct current, etc.). Controller 300 independently controls each electrode of the plurality of electrodes to target specific areas of substrate 200 that are dirty. Accordingly, a target area smaller than the entire surface of substrate 200 may be cleaned. The target area can be a line or a curve spanning across a distance of substrate 200, a region of substrate 200, or a point on substrate 200. Controller 300 controls electrodes 201 based at least in part on received user input and operating instructions, preset operating programs, and feedback signals received from sensors 202. Controller 300 includes processing circuit 301. Processing circuit 301 includes at least processor 302 and memory 303. Memory 303 stores executable computer programming modules that, when executed by processor 302, control the operation of self-cleaning substrate 200. Processing circuit 301 is in electrical communication with electrodes 201, sensors 202, and input/output mechanism 304.

Input/output mechanism 304 provides an operational programming method for a user of self-cleaning substrate 200. Input/output mechanism 304 includes at least one user input device, such as a button, a switch, a series of buttons, a series of switches, a touchscreen input for displaying an interactive graphical user interface, or any combination thereof. Input/output mechanism 304 includes at least one output device, such as an LED, a speaker, a display, a touchscreen, or any combination thereof. Input/output mechanism 304 allows a user of self-cleaning substrate 200 to instruct cleaning according to a schedule, instruct cleaning according to feedback from sensors 202, instruct on-demand cleaning, set cleaning patterns (e.g., site-specific cleaning, cleaning of substrate 200 in a raster scan pattern discussed in detail below with respect to FIG. 4, cleaning in a sequential cleaning-site pattern, etc.), and/or to cancel any already programmed instructions. Input/output mechanism 304 further allows the user of substrate 200 to view a status of substrate 200 and to view cleaning statistics (e.g., how many times substrate 200 has been cleaned, what time substrate 200 has been cleaned, when the last time substrate 200 has been cleaned, feedback data from sensors 202, etc.).

Power source 305 provides operating power to self-cleaning substrate 200, including controller 300 and electrodes 201. Power source 305 may be any suitable power source, including, but not limited to, a battery, grid power, or a combination thereof.

Figure 4:
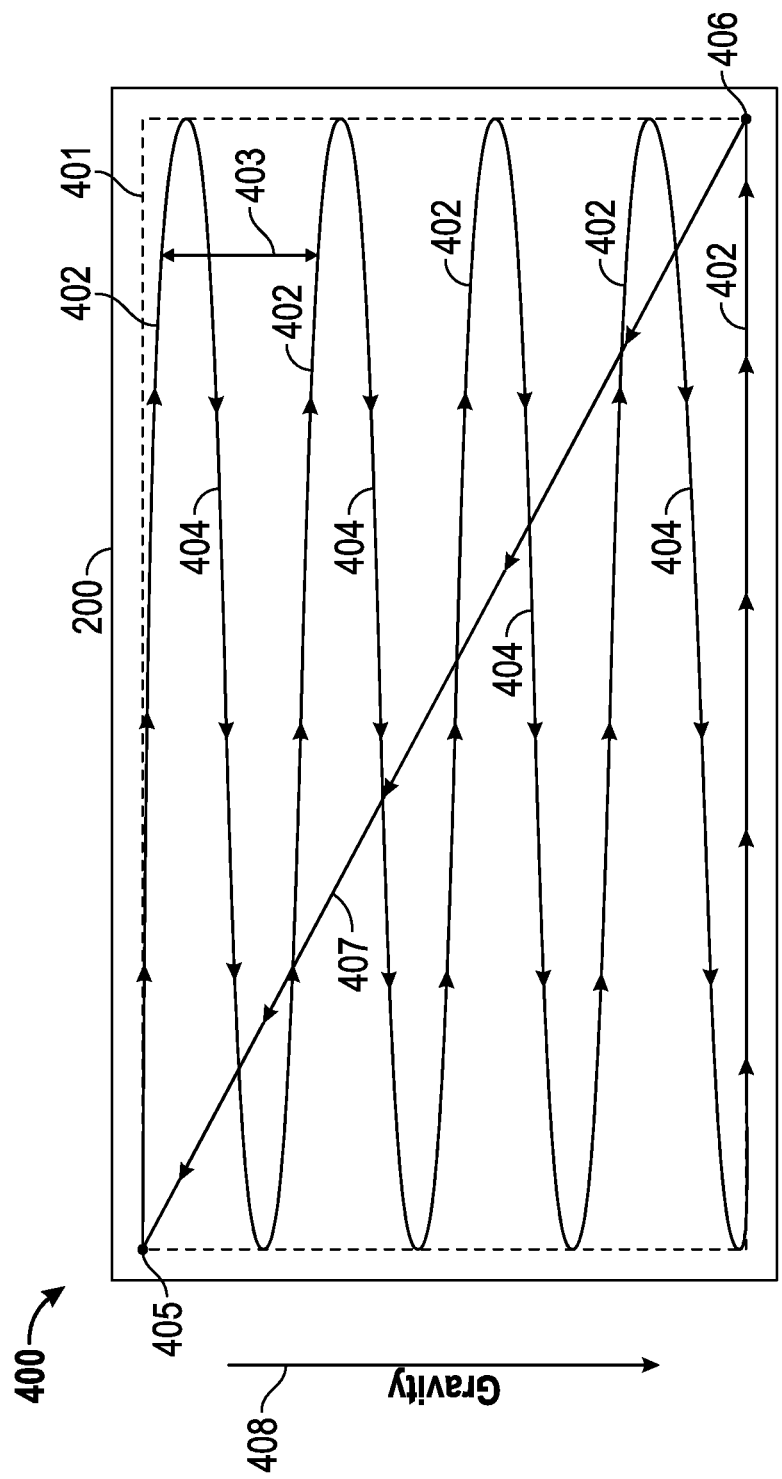
FIG. 4 is diagram of a raster scan cleaning pattern for a self cleaning substrate according to an embodiment.

Referring to FIG. 4, cleaning pattern 400 for self-cleaning substrate 200 is shown according to an embodiment. Pattern 400 is a raster scan pattern in which electrodes 201 are selectively activated and deactivated by controller 300. Pattern 400 effectively cleans target area 401 of substrate 200 by performing a series of linear cleaning sweeps 402 across the surface of substrate 200. Each linear cleaning sweep 402 is displaced from another linear cleaning sweep 402 by distance 403. Between successive linear cleaning sweeps 402, a diagonal return cleaning sweep 404 is performed. The pattern of linear cleaning sweeps 402 and diagonal return cleaning sweep 404 is performed from start point 405 until end point 406. Optionally, a final diagonal sweep 407 is performed from end point 406 to start point 405. In arrangements where substrate 200 is positioned such that it has a vertical component (e.g., a vertical window of a building), pattern 400 may be performed in the direction of gravity 408. Accordingly, dust, dirt, and other objects cleaned from the surface will be effectively moved from top to bottom by pattern 400 and assisted by gravity 408. In other embodiments (not shown) different patterns may be used; these may include different raster patterns (e.g., column-based rather than row-based, having non-corner starting points, etc.), random patterns, pseudo-random patterns, chaotic non-repeating patterns, or patterns based on non-Cartesian spatial profiles.

Figure 5:
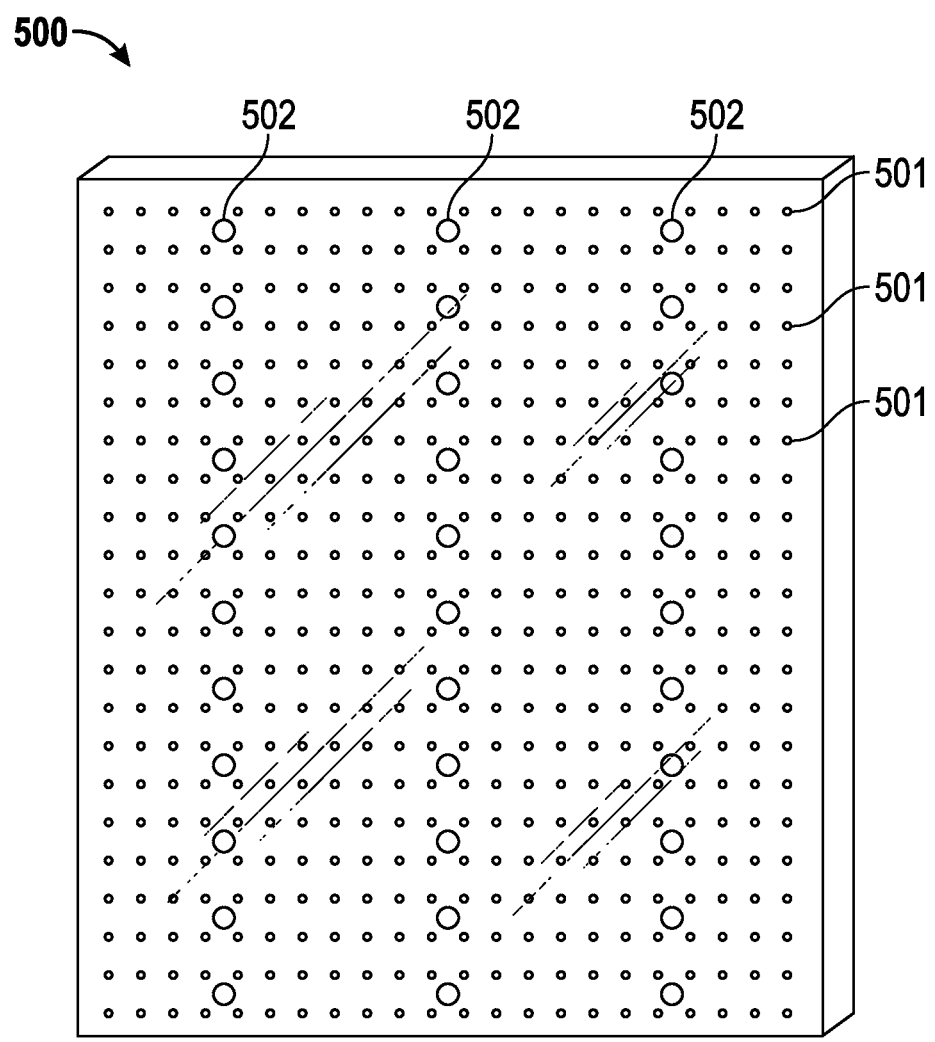
FIG. 5 is a view of self-cleaning substrate system according to an embodiment.

Referring to FIG. 5, a view of self-cleaning substrate 500 is shown according to an embodiment. Substrate 500 is similar to substrates 100 and 200. Substrate 500 may be glass, metal, wood, or any other material. In some arrangements, substrate 200 is optically transmissive and/or transparent (e.g., glass, polycarbonate, transparent ceramics, quartz, plastics, etc.). Substrate 500 includes an array of ultrasound emitters 501. Ultrasound emitters 501 may be piezoelectric transducers in contact with the surface of substrate 500, ultrasonic wave emitters aimed at the surface of substrate 500, or another type of device configured to transmit ultrasonic energy to the surface of substrate 500. Ultrasound emitters 501 are embedded in substrate 500 such that the surface of substrate 500 is smooth. Alternatively, ultrasound emitters may be placed on a surface of substrate 500 (e.g., the front surface or rear surface of substrate 500).

When powered, ultrasound emitters 501 transmit vibrational energy to substrate 500 by emitting ultrasonic waves that crest at a targeted cleaning zone. The ultrasonic waves can be bulk waves or surface waves. The ultrasonic waves can comprise longitudinal waves, shear waves, or have both longitudinal and shear components. The ultrasonic waves can comprise surface acoustic waves. The ultrasound emitters 501 may be configured to emit ultrasound waves with a specific phase and/or a specific amplitude. The vibrational energy causes substrate 500 to experience localized vibrations at locations where the ultrasound waves pass through substrate 500. The localized vibrations shake-off accumulated objects (e.g., dust, dirt, etc.) that have settled on the surface of substrate 500. The forces generated by the localized vibrations on the dust, dirt, or other particles exceed the force of adhesion between the particles and substrate 500. The forces generated are less than the force required to shatter or break substrate 500. The ultrasonic waves may be focused at and/or directed to a target zone or area of substrate 500 and may be swept across a portion of the surface of substrate 500 such that the cresting waves sweep the portion clean. Each ultrasound emitter within the array of ultrasound emitters 501 may be independently activated and deactivated. Accordingly, it is possible to clean isolated areas of the surface of substrate 500 through selective activation and deactivation of each ultrasound emitter 501.

In the embodiment of FIG. 5, substrate 500 further includes sensors 502. Sensors 502 detect the presence and amount of dust, dirt, and other objects on the surface of substrate 500 in a similar manner as discussed above with respect to sensors 202. Sensors 502 may be optical sensors configured to measure variances in the optical throughput of substrate 500. For example, when dust or dirt accumulates on a surface of substrate 500, the optical transmissiveness or transparency of substrate 500 will be reduced. Sensors 502 detect this reduction. In an alternative arrangement, sensors 502 are resistance sensors configured to detect changes in a level of electrical resistance of substrate 500 caused by the buildup of dust, dirt, and other objects on the surface of substrate 500. Sensors 502 are embedded within substrate 500. Alternatively, sensors 502 are coupled to the surface of substrate 500. Sensors 502 are arranged in an array. Alternatively, a single sensor is capable of site-specific (i.e., at a specific location on the surface of substrate 500) dust, dirt, and other object accumulation on the surface of substrate 500. In yet another alternative configuration, sensors are arranged around the periphery of substrate 500.

In one embodiment, a controller automatically controls the ultrasound emitters 501 based on feedback from sensors 502. The controller further enables a user to manually provide inputs with respect to cleaning operations for substrate 500. The controller functions in the same manner as described above with respect to controller 300. The controller is capable of controlling the ultrasound emitters to clean substrate 500 in any of the above patterns discussed with respect to substrate 200 (e.g., the raster scan pattern discussed above with respect to FIG. 4).

Figure 6:
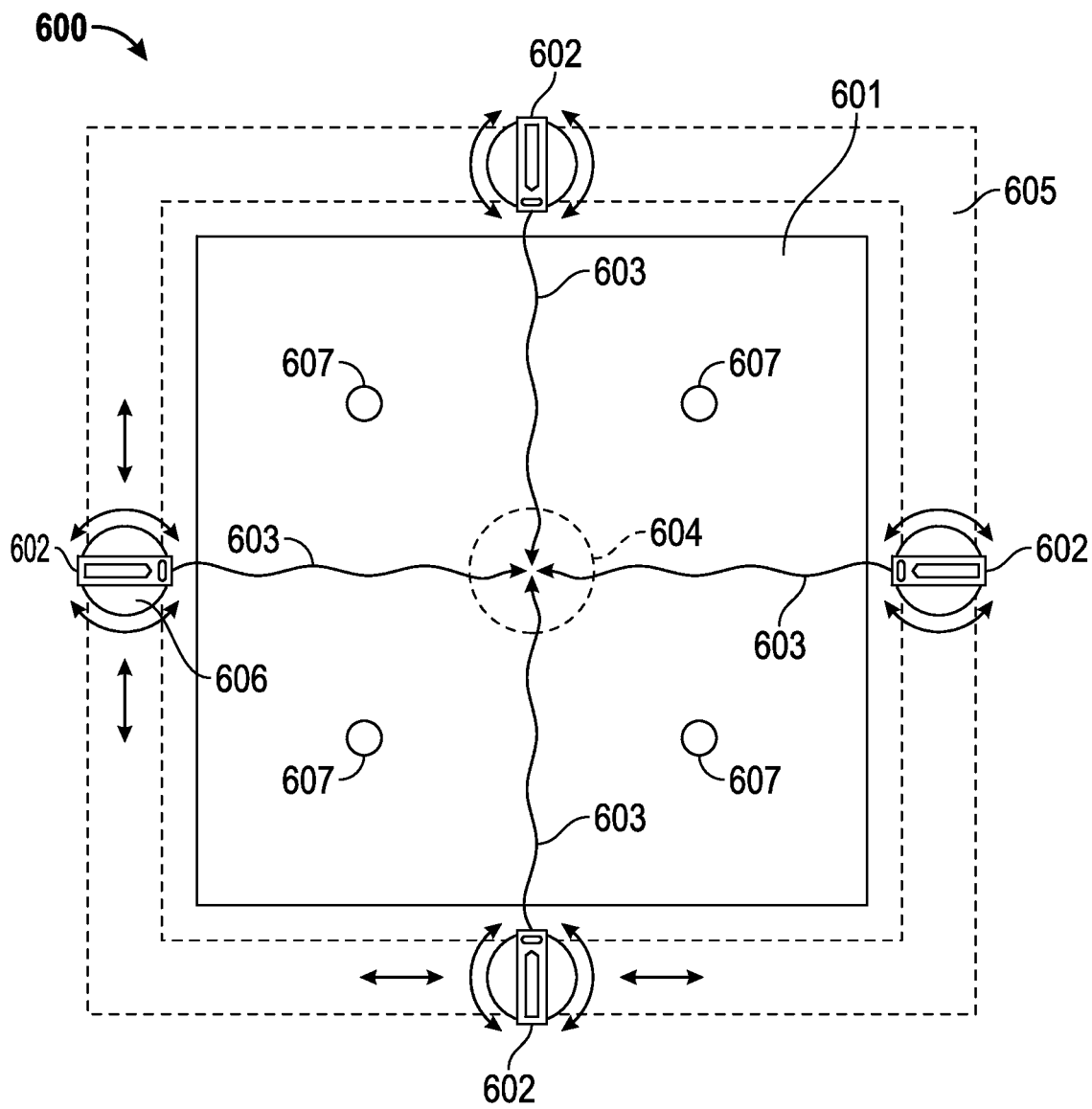
FIG. 6 is a view of a self-cleaning substrate system according to an embodiment.

Referring to FIG. 6, a system 600 for cleaning the surface of substrate 601 is shown according to an embodiment. Substrate 601 may be glass, metal, wood, or any other material. In some arrangements, substrate 601 is optically transmissive and/or transparent (e.g., glass, polycarbonate, transparent ceramics, quartz, plastics, etc.). System 600 includes a plurality of ultrasound emitters 603. Although system 600 is shown as including four ultrasound emitters 602, it should be understood that any number of ultrasound emitters 602 may be employed in system 600. Ultrasound emitters 602 are configured to emit and direct ultrasound waves 603 at target area 604 on the surface of substrate 601. The ultrasonic waves can be bulk waves or surface waves. The ultrasonic waves can be longitudinal waves, shear waves, or have both longitudinal and shear components. The ultrasonic waves may comprise surface acoustic waves. The ultrasonic waves may have a specific phase and/or a specific amplitude. The ultrasound waves 603 crest at target area 604 and transmit vibrational energy to the surface of substrate 601 at target area 604. The ultrasound emitters 603 may be configured to focus and/or to direct ultrasonic waves to the target area 604. This passing of waves 603 through and/or over substrate 601 causes localized shaking of the surface of substrate 601. The forces generated by the localized vibrations on the dust, dirt, or other particles exceed the force of adhesion between the particles and substrate 601. The forces generated are less than the force required to shatter or break substrate 601. The localized shaking of substrate 601 causes dust, dirt, and other objects on the surface of substrate 601 at target area 604 to shake off of substrate 601.

The plurality of ultrasound emitters 602 are coupled to frame 605 which surrounds at least a portion of substrate 601. Frame 605 is shown as being arranged in a rectangular shape, however, it should be appreciated that frame 605 can be sized and shaped to surround any size and shape of a substrate. Each ultrasound emitter 602 is coupled to frame 605 through mounting bracket 606, which is coupled to both frame 605 and ultrasound emitter 602. Bracket 606 enables controlled rotational motion and linear motion about frame 605 for each ultrasound emitter 602. A motor (e.g., a stepper motor, a gear motor, rotary actuator, etc.) provides the rotational motion. A linear drive system (e.g., belt drive, motorized gear and cog drive, a linear motor, linear actuator, etc.) provides the linear motion along frame 605. Accordingly, each ultrasound emitter 602 is positionable and amiable such that any area of substrate 601 can be targeted for localized, site-specific surface cleaning.

Still referring to FIG. 6, system 600 further includes sensors 607. Sensors 607 detect the presence and amount of dust, dirt, and other objects on the surface of substrate 601. Sensors 607 operate in a similar manner as discussed above with respect to sensors 202 and 502. In one embodiment, sensors 607 are optical sensors configured to measure variances in the optical throughput of substrate 601. For example, when dust or dirt accumulates on a surface of substrate 601, the optical transmissiveness or transparency of substrate 601 will be reduced. Sensors 607 detect this reduction. In an alternative arrangement, sensors 607 are resistance sensors configured to detect changes in a level of electrical resistance of substrate 601 caused by the buildup of dust, dirt, and other objects on the surface of substrate 601. In one embodiment, sensors 607 are embedded within substrate 601. Alternatively, sensors 607 are coupled to the surface of substrate 601. Sensors 607 are arranged in an array. Alternatively, a single sensor is capable of site-specific (i.e., at a specific location on the surface of substrate 601) targeting of dust, dirt, and other object accumulation on the surface of substrate 601. In yet another alternative configuration, sensors are arranged around the periphery of substrate 601.

Figure 7:
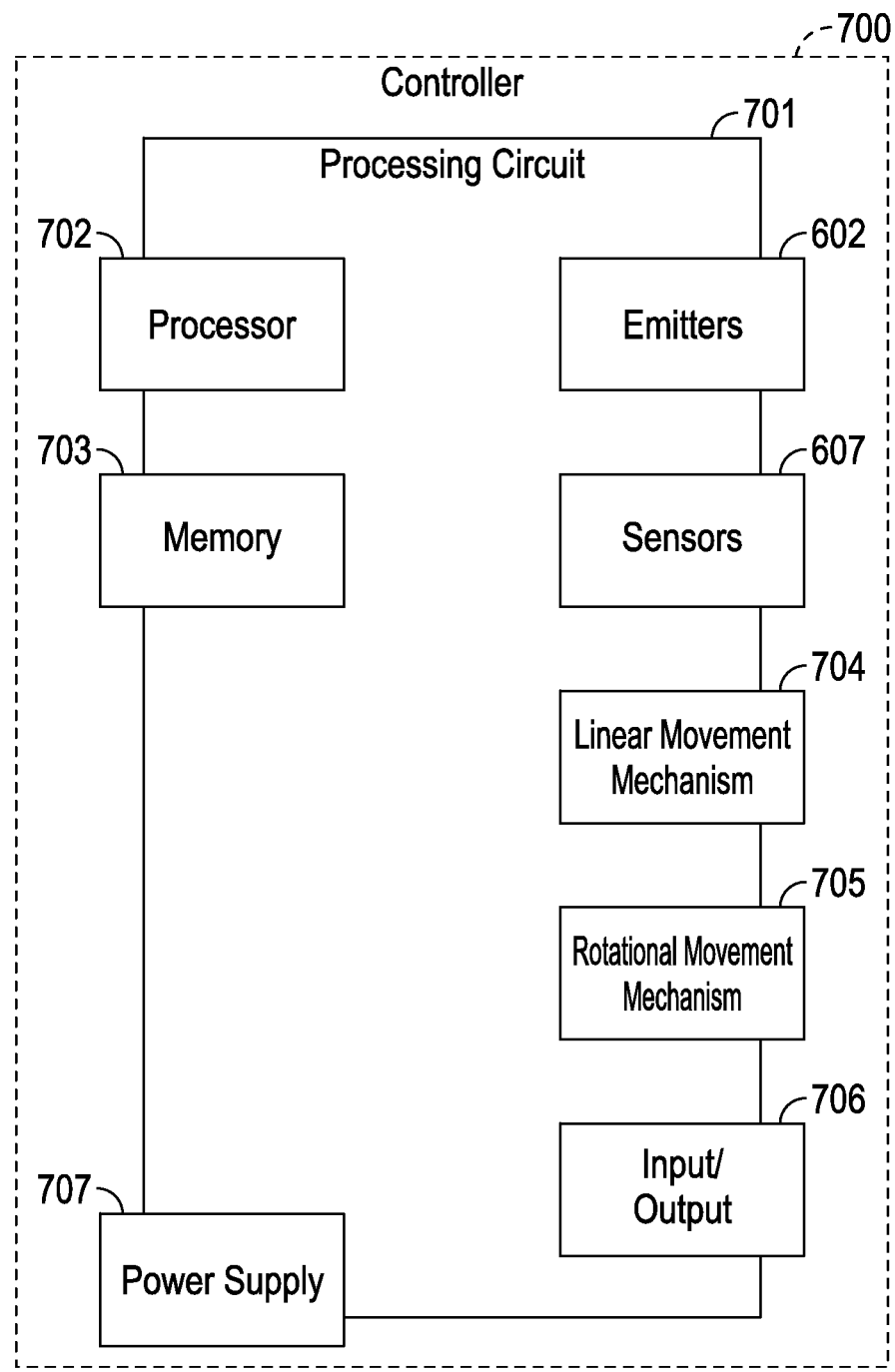
FIG. 7 is a block diagram of a controller for a self-cleaning substrate system.

Referring to FIG. 7, controller 700 is shown according to an embodiment. Controller 700 is configured to control the operation of system 600, including the operation of ultrasound emitters 602. Controller 700 is similar to controller 300, however controller 700 includes additional components to control the actuation of ultrasound emitters 602. Controller 700 includes processing circuit 701. Processing circuit 701 includes processor 702 and memory 703. Memory 703 stores executable computer programming modules that, when executed by processor 702, control the operation of system 600. Processing circuit 701 is in electrical communication with ultrasound emitters 602, sensors 607, linear movement mechanism 704, rotational movement mechanism 705, and input/output mechanism 706.

Input/output mechanism 706 provides an operational programming method for a user of system 600. Input/output mechanism 706 includes at least one input device. The input device may be a user input, such as a button, a switch, a series of buttons, a series of switches, a touchscreen input for displaying an interactive graphical user interface, or any combination thereof. The input device may be configured to receive an electronic signal from a device (e.g., a memory device electronically coupled to controller 700, wherein the memory device includes operating instructions, an external controller, etc.). Input/output mechanism 706 includes at least one output device, such as an LED, a speaker, a display, a touchscreen, or any combination thereof. Input/output mechanism 706 allows a user of system 600 to instruct cleaning according to a schedule, instruct cleaning according to feedback from sensors 607, instruct on-demand cleaning, set cleaning patterns (e.g., site-specific cleaning, cleaning of substrate 601 in a raster scan pattern discussed in detail above with respect to FIG. 4, cleaning substrate 601 in a sequential cleaning-site pattern, etc.), and/or to cancel any already programmed instructions. Input/output mechanism 706 further allows the user of system 600 to view a status of system 600 and to view cleaning statistics (e.g., how many times substrate 601 has been cleaned, what time substrate 601 has been cleaned, when the last time substrate 601 has been cleaned, feedback data from sensors 607, etc.).

Power source 707 provides operating power to system 600, including to controller 700 and ultrasound emitters 602. Power source 707 may be any suitable power source, including, but not limited to, a battery, grid power, or a combination thereof.

Figure 8:
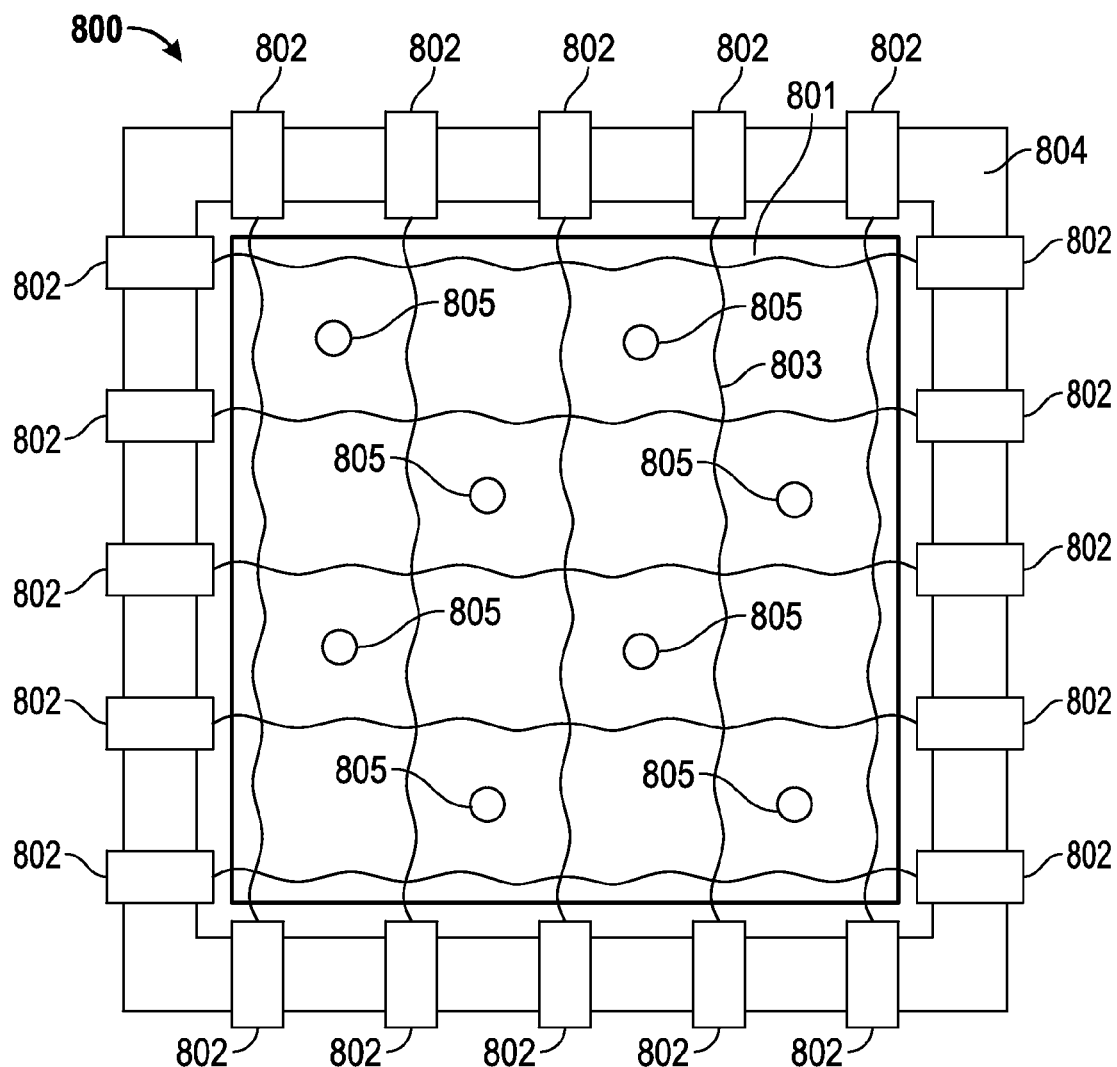
FIG. 8 is a view of a system for cleaning a substrate according to an embodiment.

Referring to FIG. 8, a system 800 for cleaning the surface of substrate 801 is shown according to an embodiment. System 800 is similar to system 600. However, unlike system 600, system 800 includes a plurality of fixed ultrasound emitters 802. Ultrasound emitters 802 are fixed about the perimeter of substrate 801 such that each ultrasound emitter 802 emits an ultrasonic wave 803 onto the surface of substrate 801. The ultrasonic waves can be bulk waves or surface waves. The ultrasonic waves can be longitudinal waves, shear waves, or have both longitudinal and shear components. Because the ultrasound emitters 802 are fixed around the perimeter of substrate 801, discretely activated ultrasonic waves 803 may form a grid pattern over the surface of substrate 801. Alternatively, a set of ultrasound emitters 802 may emit in a coherent manner, each with a different phase or amplitude so as to emit a beam which can be directed toward and/or focused at desired sites on the surface of substrate 801.

Although system 800 is shown as having ultrasound emitters 802 around the entire perimeter of substrate 801, it should be appreciated that emitters may be placed only along one lateral side and one vertical side and achieve a similar grid pattern of waves 803. The ultrasonic waves 803 transmit vibrational energy to the surface of substrate 801 that cause localized shaking of the surface of substrate 801. The localized shaking of substrate 801 causes dust, dirt, and other objects to be dislodged from the surface of substrate 801. The forces generated by the localized shaking on the dust, dirt, or other particles exceed the force of adhesion between the particles and substrate 801. The forces generated are less than the force required to shatter or break substrate 801.

System 800 may be controlled by a similar controller as discussed above with respect to system 600 (e.g., controller 700). Accordingly, each of the plurality of ultrasound emitters 802 may be selectively activated and deactivated to perform site-specific cleaning of areas of substrate 801. The target area to be cleaned may be cleaned by a single ultrasound emitter 802 or multiple ultrasound emitters 802 (e.g., both a vertical emitter and a horizontal emitter may clean the same area). The target area may be cleaned by a directed or focused wave from a coherently activated set of ultrasound emitters 802. The selective activation may be based on feedback from sensors 805, based on a user-programmed schedule, and/or based on an on demand command from a user. Sensors 805 are similar to sensors 202, 502, and 607. Sensors 805 detect the presence and amount of dust, dirt, and other objects on the surface of substrate 801. Sensors 805 may be optical sensors configured to measure variances in the optical throughput of substrate 801. For example, when dust or dirt accumulates on a surface of substrate 801, the optical transmissiveness or transparency of substrate 801 will be reduced. Sensors 805 detect this reduction. In an alternative arrangement, sensors 805 are resistance sensors configured to detect changes in a level of electrical resistance of substrate 801 caused by the buildup of dust, dirt, and other objects on the surface of substrate 801. In one embodiment, sensors 805 are embedded within substrate 801. Alternatively, sensors 805 are coupled to the surface of substrate 801. Sensors 805 may be arranged in an array. Alternatively, a single sensor is capable of site-specific (i.e., at a specific location on the surface of substrate 801) dust, dirt, and other object accumulation on the surface of substrate 801. In yet another alternative configuration, sensors are arranged around the periphery of substrate 801 (e.g., coupled to frame 804).

Figure 9:
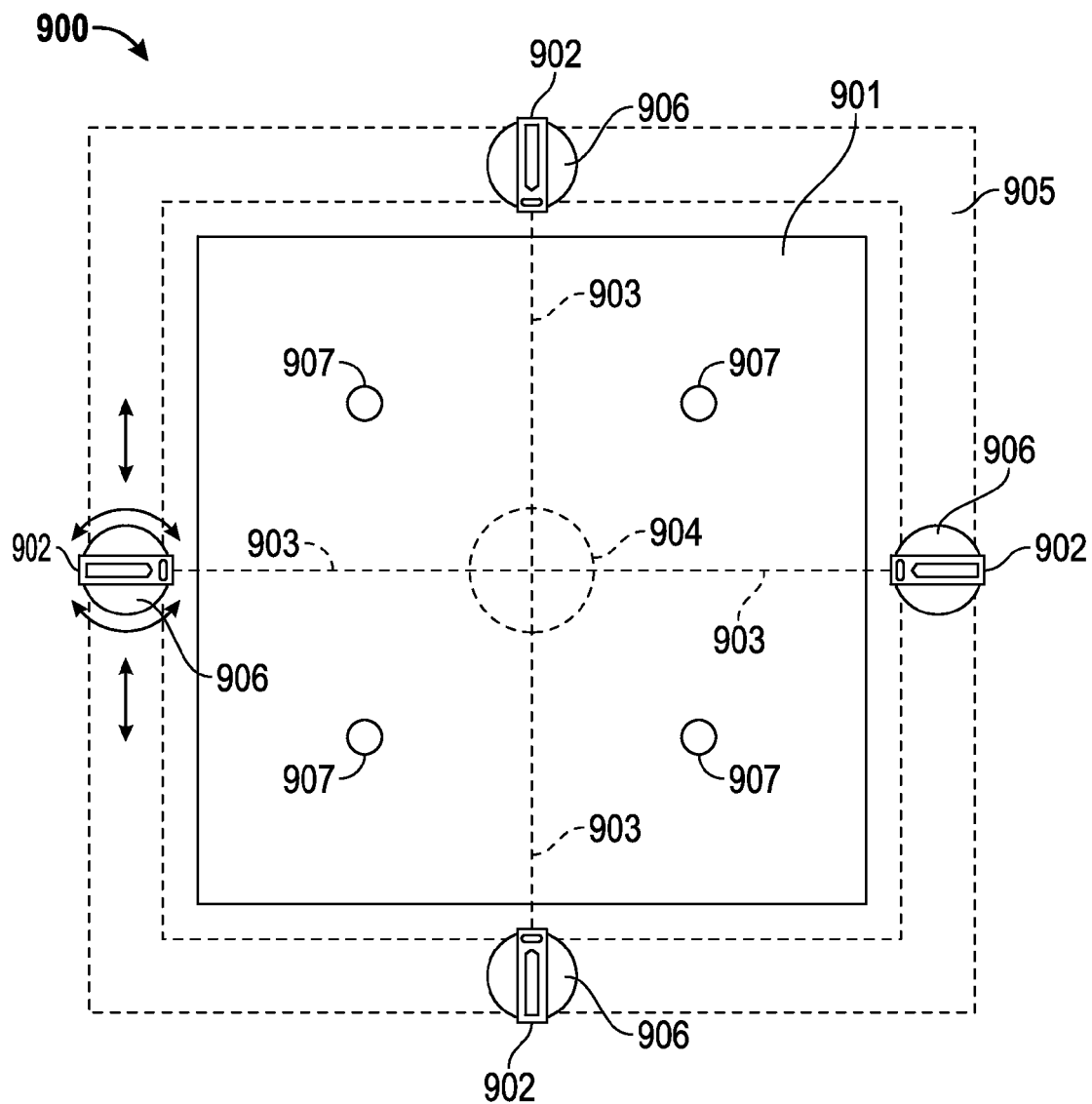
FIG. 9 is a view of a system for cleaning a substrate according to an embodiment.

Referring to FIG. 9, a system 900 for cleaning substrate 901 is shown according to an embodiment. System 900 is similar to system 600. Substrate 901 may be glass, metal, wood, or any other material. In some arrangements, substrate 901 is optically transmissive and/or transparent (e.g., glass, polycarbonate, transparent ceramics, quartz, plastics, etc.). System 900 includes a plurality of coronal wind generators 902. As discussed in further detail below, coronal wind generators 902 accelerate air particles to form a moving stream of air. Although system 900 is shown as including four coronal wind generators 902 arranged around substrate 901, it should be understood that any number of coronal wind generators 902 may be employed in system 900. In an alternative arrangement, coronal wind generators 902 are arranged in an array along substrate 901. Coronal wind generators 902 are configured to generate a stream of air 903. Stream of air 903 may be positively charged, negatively charged, or carry no charge. The stream of air 903 may be focused to concentrate at target area 904 to cause dust, dirt, and other objects on the surface of substrate 901 at target area 904 to blow off of substrate 901. In an alternative arrangement, coronal wind generators 902 may be positioned such that a uniform stream of air is passed over the surface of substrate 901.

The plurality of coronal wind generators 902 are coupled to frame 905 which surrounds at least a portion of substrate 901. Frame 905 is shown as being arranged in a rectangular shape; however, it should be appreciated that frame 905 can be sized and shaped to surround any size and shape of a substrate. Each coronal wind generator 902 is coupled to frame 905 through mounting bracket 906, which is coupled to both frame 905 and coronal wind generator 902. Bracket 906 enables controlled rotational motion and linear motion about frame 905 for each coronal wind generator 902. A motor (e.g., a stepper motor, a gear motor, etc.) provides the rotational motion. A linear drive system (e.g., belt drive, motorized gear and cog drive, a linear motor, etc.) provides the linear motion along frame 905. Accordingly, each coronal wind generator 902 is positionable and aimable such that any area of substrate 901 can be targeted for localized, site-specific surface cleaning. In an alternative arrangement, coronal wind generators 902 may be fixed about frame 905 in a similar arrangement to ultrasound emitters 801 of system 800. In such an arrangement, the coronal winds emitted by the coronal wind generators 902 will form a grid. Accordingly, selective activation of opposing emitters can target rows (along the length of the generated winds) or target points (e.g., where wind patterns intersect). In an alternative arrangement (not shown) coronal wind generators 902 are coupled to a plurality of sites on the surface of substrate 901 (e.g., in a grid or hexagonal pattern). One or more coronal wind generators located near a target point can be activated such that their coronal winds clean the target site.

Still referring to FIG. 9, system 900 further includes sensors 907. Sensors 907 are similar to sensors 202, 502, 607, and 805. Sensors 907 detect the presence and amount of dust, dirt, and other objects on the surface of substrate 901. Sensors 907 may be optical sensors configured to measure variances in the optical throughput of substrate 901. For example, when dust or dirt accumulates on a surface of substrate 901, the optical transmissiveness or transparency of substrate 901 will be reduced. Sensors 907 detect this reduction. In an alternative arrangement, sensors 907 may be resistance sensors configured to detect changes in a level of electrical resistance of substrate 901 caused by the buildup of dust, dirt, and other objects on the surface of substrate 901. Sensors 907 are embedded within substrate 901. Alternatively, sensors 907 are coupled to the surface of substrate 901 or positioned at a distance from substrate 901 and configured to monitor substrate 901. Sensors 907 are arranged in an array. Alternatively, a single sensor is capable of site-specific (i.e., at a specific location on the surface of substrate 901) dust, dirt, and other object accumulation on the surface of substrate 901. In yet another alternative configuration, sensors are arranged around the periphery of substrate 901.

Figure 10:
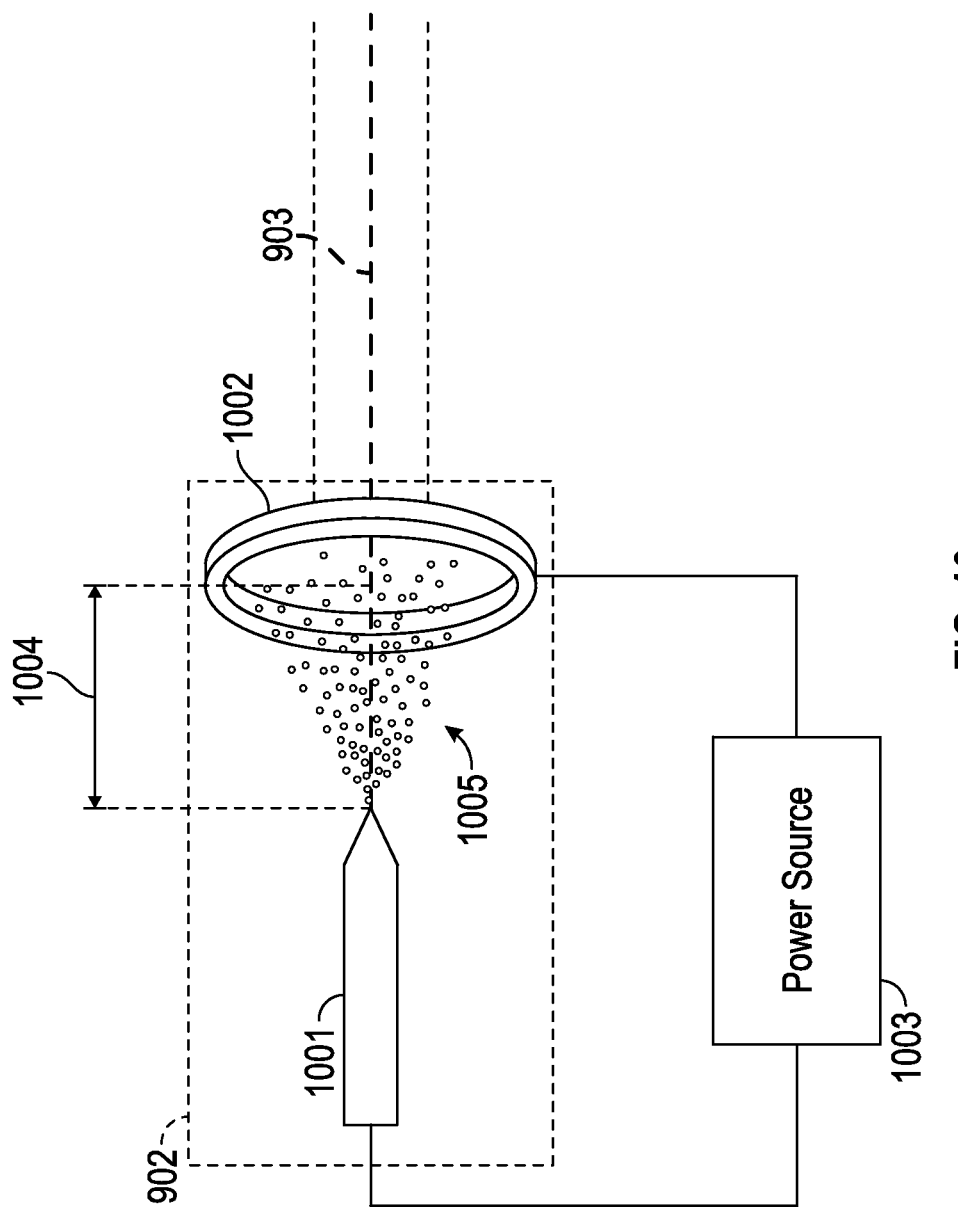
FIG. 10 is schematic view of a coronal wind generator of the system of FIG. 9 according to an embodiment.

Referring to FIG. 10, a view of coronal wind generator 902 is shown according to an embodiment. Coronal wind generator 902 includes electrode 1001 and conductive ring 1002. Electrode 1001 is shaped such that electrode 1001 comes to a point. Electrode 1001 and ring 1002 are electrically connected to power source 1003. The point of electrode 1001 and the center of ring 1002 are separated by a distance 1004. Power source 1003 provides alternating current and/or high voltage direct current. Power source 1003 outputs electrical power having high voltage such that an electric field between electrode 1001 and ring 1002 is in the order of 10 kilovolts per centimeter. Accordingly, when power source 1003 is activated, an electrostatic field is generated between the point of electrode 1001 and ring 1002 causing a coronal discharge at the point of electrode 1001. The coronal discharge ionizes the air such that ionized air particles 1005 are attracted towards ring 1002 and accelerate to ring 1002. As ionized air particles 1005 accelerate towards ring 1002, ionized air particles 1005 collide with neutrally charged air particles, which generate stream of air 903. Stream of air may also include a portion of ionized air particles 1005. A more detailed discussion of coronal wind generation can be found in U.S. Pat. No. 3,638,058 to Robert S. Fritzius entitled, "ION WIND GENERATOR." In an alternative embodiment, coronal wind generator 902 can be implemented in a flat, surface-mounted configuration in which electrode 1001 and conductive ring 1002 are replaced by surface-mounted components such as tip for electrode 1001 and a linear strip or a pair of electrodes for conductor 1002. Surface-mounted configurations may be attractive for systems having arrays of coronal wind generators fixed to the surface or the perimeter of the substrate.

System 900 may be controlled by a similar controller as discussed above with respect to system 600 (e.g., controller 700). Each of a plurality of coronal wind generators 902 may be selectively activated and deactivated to perform site-specific cleaning of areas of substrate 901. Target area 904 may be cleaned by a single coronal wind generator 902 or multiple coronal wind generators 902. The selective activation may be based on feedback from sensors 907, based on a user-programmed schedule, and/or based on an on demand command from a user.

Figure 11:
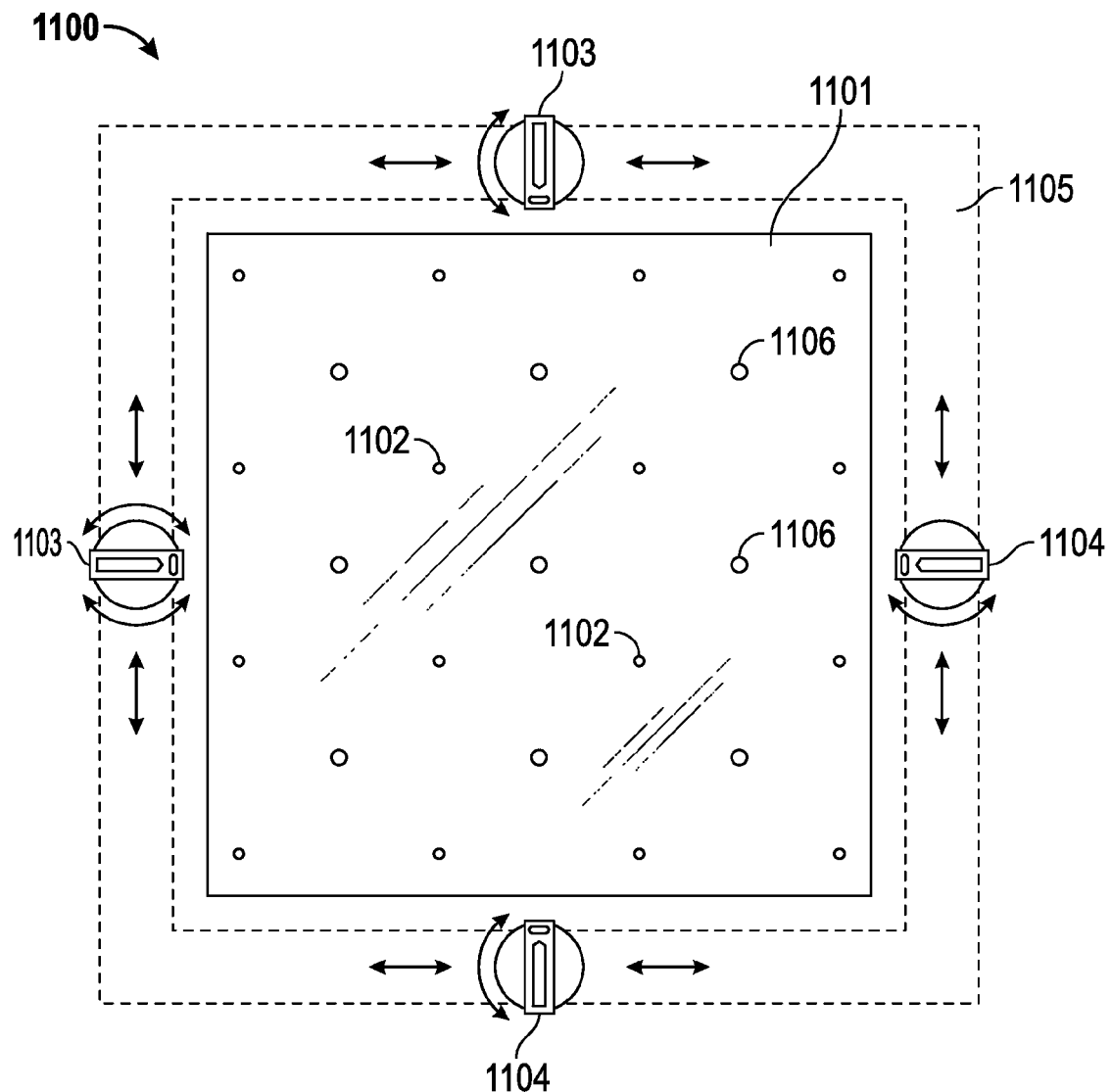
FIG. 11 is a view of a system for cleaning a substrate according to an embodiment.

Any of the above described cleaning mechanisms employed by the above described systems and/or self-cleaning substrates may be used together in a single system. Referring to FIG. 11 system 1100 for cleaning substrate 1101 is shown according to an embodiment. Substrate 1101 may be glass, metal, wood, or any other material. In some arrangements, substrate 1101 is optically transmissive and/or transparent (e.g., glass, polycarbonate, transparent ceramic, quartz, plastic, etc.).

System 1100 includes an array of electrodes 1102 (e.g., similar to electrodes 201). Accordingly, electrodes 1102 may be nano-electrodes or micro-electrodes. Electrodes 1102 may be alternating current electrodes or direct current electrodes. Electrodes 1102 may be embedded in substrate 1101 such that electrodes do not protrude from a surface of substrate 1101 such that the surface of substrate 1101 is smooth. In an alternative arrangement, array of electrodes 1102 is placed on a surface of substrate 1101 (e.g., the front surface or rear surface of substrate 1101). Electrodes 1102 function in the same manner as described above with respect to electrodes 201.

System 1100 additionally includes ultrasound emitters 1103 and coronal wind generators 1104. Ultrasound emitters 1103 are similar to and function in the same manner as ultrasound emitters 602 of system 600. Coronal wind generators 1104 are similar to and function in the same manner as coronal wind generators 902. Ultrasound emitters 1103 and coronal wind generators 1104 are coupled to frame 1105, which surrounds a periphery of substrate 1101. Ultrasound emitters 1103 and wind generators 1104 may be moveable such that each ultrasound emitter 1103 and each wind generator 1104 can rotate about frame 1105 and slide along frame 1105. In an alternative arrangement, a plurality of ultrasound emitters 1103 and wind generators 1104 are fixed at various positions along frame 1105 in a similar manner as ultrasound emitters 802 are fixed about frame 804 in system 800. In an alternative arrangement, a plurality of ultrasound emitters 1103 and wind generators 1104 are fixed at various positions along the surface of the substrate similarly to the array or electrodes 1102.

Although system 1100 is shown as including electrodes, ultrasound emitters, and coronal wind generators, it should be understood that any combination of the three cleaning technologies may be employed in a single system (e.g., a system having electrodes and coronal wind generators, a system having electrodes and ultrasound emitters, or a system having ultrasound emitters and coronal wind generators).

System 1100 further includes sensors 1106. Sensors 1106 are similar to sensors 202, 502, 607, 805, and 907. Sensors 1106 detect the presence and amount of dust, dirt, and other objects on the surface of substrate 1101. Sensors 1106 may be optical sensors configured to measure variances in the optical throughput of substrate 1101. For example, when dust or dirt accumulates on a surface of substrate 601, the optical transmissiveness or transparency of substrate 1101 will be reduced. Sensors 1106 detect this reduction. In an alternative arrangement, sensors 1106 are resistance sensors configured to detect changes in a level of electrical resistance of substrate 1101 caused by the buildup of dust, dirt, and other objects on the surface of substrate 1101. Sensors 1106 may be embedded within substrate 1101. Alternatively, sensors 1106 may be coupled to the surface of substrate 1101 or offset from the surface by a distance. Sensors 1106 are arranged in an array. Alternatively, a single sensor is capable of site-specific (i.e., at a specific location on the surface of substrate 1101) dust, dirt, and other object accumulation on the surface of substrate 1101. In yet another alternative configuration, sensors are arranged around the periphery (e.g., along frame 1105) of substrate 1101.

System 1100 is controlled by a controller similar to controller 300 and/or controller 700. Accordingly, each of the plurality of cleaning devices (i.e., each electrode 1102, each ultrasound emitter 1103, and each coronal wind generator 1104) may be selectively activated and deactivated to perform site-specific cleaning of areas of substrate 1101. An area to be cleaned may be cleaned by an individual cleaning device or multiple cleaning devices of the same or different types. The selective activation may be based on feedback from sensors 1106, based on a user-programmed schedule, and/or based on an on demand command from a user.

Figure 12:
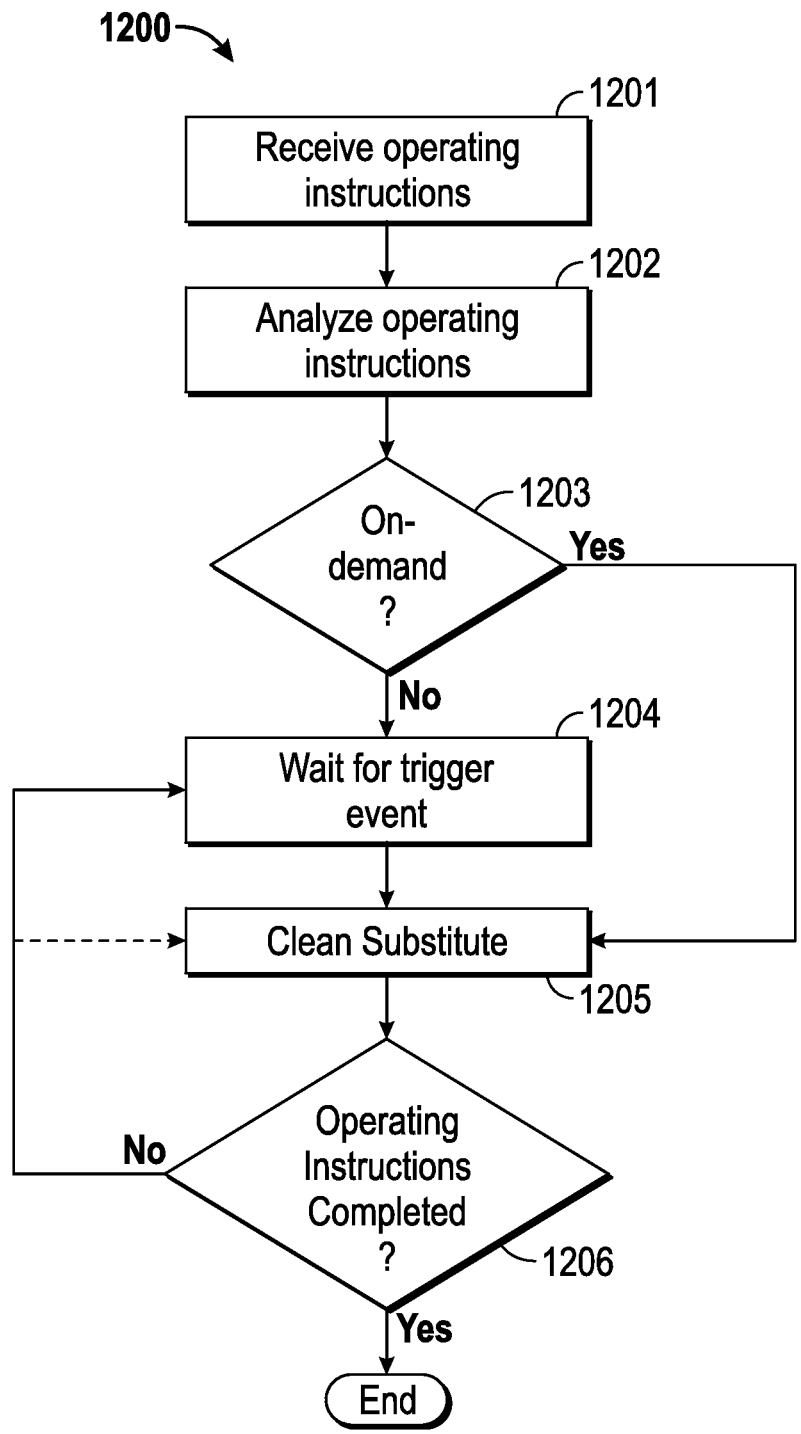
FIG. 12 is flow diagram of a method of cleaning a substrate according to an embodiment.

Referring to FIG. 12, a method 1200 of cleaning a substrate is shown according to an embodiment. Method 1200 is performed by a programmable self-cleaning substrate system including a controller configured to receive user instructions and execute the user instructions, such as self-cleaning substrate 200, self-cleaning substrate 500, system 600, system 800, system 900, and/or system 1100.

Operating instructions are received from a user (1201). The controller of the self-cleaning substrate system includes a user input mechanism. The input mechanism includes at least one of a button, a switch, a series of buttons, a series of switches, a touchscreen input for displaying an interactive graphical user interface, or any combination thereof. The input mechanism allows a user of the system to instruct cleaning according to a schedule, instruct cleaning according to feedback from sensors of the system (e.g., sensors that determine a level of dust, dirt, or other objects that have accumulated on the surface of the substrate, sensors that determine an area where a person touches the substrate), instruct on-demand cleaning, set cleaning patterns (e.g., site-specific cleaning, cleaning of the substrate in a raster scan pattern as discussed above with respect to FIG. 4, cleaning in a sweeping pattern such that gravity assists the cleaning, cleaning known areas of the substrate that are susceptible for dust and dirt buildup such as areas where a person may be inclined to touch the substrate, etc.), and/or to cancel any already programmed instructions. Accordingly, the user can provide operating instructions to the system through the user input.

The system analyzes the received operating instructions (1202). During analysis, the system determines whether the received operating instructions correlate to an on-demand cleaning instruction (1203). If the instructions correlate to an on-demand cleaning instruction, the system omits 1204 and proceeds to 1205. If the instructions do not correlate to an on-demand cleaning instruction, the system waits for a trigger event (1204). The trigger event varies depending on the operating instructions. The trigger event may be a specific time and/or date, a threshold dirtiness level or cleanliness level as indicated by a sensor feedback signal, a threshold number of touches by a person (e.g., if the substrate is part of a touchscreen device including the cleaning mechanism, the device's software can indicate the number of times a user has touched a certain area of the touchscreen, the frequency of touches, the time since the last touch, etc.), a display-usage of a specific site on the substrate (e.g., if the substrate is part of a display). The trigger event may be the time since a site has been cleaned, or a quality of a previous cleaning of the site, or the type of cleaning method previously used.

Upon detecting the trigger event or receiving an on-demand signal, the system performs a designated cleaning operation on the substrate (1205). The cleaning may involve emitting an electric field that electrically repels dust, dirt, and other objects away from the substrate. The cleaning may involve focusing ultrasonic waves at the substrate to cause localized shaking of the substrate to shake dust, dirt, and other objects off of the surface of the substrate. The cleaning may involve the use of coronal winds to blow and repel dust, dirt, and other objects off of the surface of the substrate. The cleaning may involve a combination of any of the above cleaning techniques. Each cleaning technique is described in further detail above. Depending on the operating instructions and sensor feedback, the cleaning can be confined to a specific area of the substrate. The area may be a subset of the surface of the substrate, a line along the surface of the substrate, a curve along the surface of the substrate, or a point on the surface of the substrate. For example, in a situation where the system sensors determine that a particular area of the surface of the substrate has a threshold amount of dust buildup and the operating instructions instruct cleaning based on sensor feedback, only the area having the threshold amount of dust buildup may be targeted for cleaning. In such a setup, the sensor feedback signal includes the location of the detected dust, dirt, and other objects on the surface of the substrate. Alternatively, the operating instructions can instruct that the entire substrate surface be cleaned. During entire substrate cleaning (or large target area cleaning), the system may be programmed to clean the substrate in an efficient sweeping pattern (e.g., a raster scan pattern). The cleaning is also performed such that gravity assists in sweeping dust, dirt, and other objects off of and away from the substrate (e.g., as discussed above with respect to FIG. 4).

In some arrangements, the sensors actively provide feedback to the controller during the cleaning operation. The controller analyzes the feedback during the cleaning operation to adjust the cleaning operation as it is occurring. The controller may increase or decrease the operating power of the cleaning mechanisms (e.g., increase or decrease the voltage or current provided to the electrodes, increase or decrease the amplitude or frequency of ultrasonic waves emitted, increase or decrease the voltage or current provided to the coronal wind generators) during the cleaning operation based on the sensor feedback. Further, the controller may stop the cleaning operation once a detected level of dirtiness falls below a designated threshold. Accordingly, the controller instructs cleaning of the substrate until the substrate reaches a designated level of cleanliness.

Further referring to FIG. 12, after the cleaning operation is complete, the system determines if the operating instructions are completed (1206). If the instructions are not completed, the system returns to either 1204 or 1205. The system returns to 1204 if no more cleaning is to be performed until another trigger event is detected (e.g., for daily, weekly, or monthly cleanings, for the next sensor feedback indication of a dirty substrate, etc.). The system returns to 1205 if the area already cleaned is still dirty or if more than one area is to be cleaned based on the same trigger event. For example, the system may successively clean a plurality of areas or sites. If the operating instructions are completed, method 1200 ends until another set of operating instructions are received.

The above self-cleaning substrates and methods of cleaning a substrate surface have a wide range of applicability and uses. For example, any of the above substrates may be used as a self-cleaning window of a building, an automobile, or an aircraft. As an additional example, the substrate may be integrated into a solar panel to help ensure maximum efficiency of the solar panel. As another example, a cleaning frame may be retrofitted around a non-self-cleaning substrate. The frame may include any of the above systems utilizing cleaning mechanisms mounted on a frame. For example, a cleaning frame may be installed as a retrofit solution to make an ordinary substrate (e.g., a window of a skyscraper) a self-cleaning substrate.

As yet another example, the above systems and methods may be employed with electronic devices (e.g., smartphones, tablets, laptop computers, televisions, etc.). In the case of a touchscreen device, the self-cleaning substrate system may target areas where users are more likely to touch for regular cleaning. For example, locations where a user interacts with a graphical user interface displayed on the touchscreen (e.g., icon locations, menu button locations, a search box, an on-screen keyboard, etc.) may be preferentially targeted. The cleaning may be based on receiving a threshold number of touches at an area of the touchscreen. The cleaning may be based on a usage pattern of the display, i.e., areas which most often display changing or high-value visual content are preferentially targeted for cleaning. Alternatively, the display device may highlight areas of the screen that need cleaning. The highlighted areas may then be cleaned manually by a user or by any of the above discussed substrate cleaners. In another arrangement, the display device may highlight areas of the screen that have already been cleaned. Further, the self-cleaning screen may use built in orientation sensors to instruct cleaning such that gravity assists with the cleaning operation (e.g., gravity causes freed dust or dirt to fall to dirty portions of the screen yet to be cleaned instead of falling on recently cleaned portions of the screen). In arrangements where the substrate is part of a touchscreen device, the user can instruct site specific cleaning by providing touch inputs at areas to be cleaned. Depending on provided cleaning instructions, cleaning operations can be performed when the device is being used or when it is detected that the device is not being used (e.g., when the screen is off).

Still further, the above systems and methods may be triggered by an input other than a detected characteristic of the substrate (i.e., by an input other than a detected dirtiness of the substrate). For example, in arrangements where the substrate is a window, the controller of the substrate can automatically detect when blinds are closed, shades are closed, or the window is not otherwise in use (e.g., being looked out of by a user) and instruct cleaning in those situations. As an additional example, in arrangements where the substrate is part of a display device, the controller of the substrate can automatically detect when a cover of the display device (e.g., a flip cover) is in the closed position and instruct cleaning when the cover is closed. Still further, if the substrate is part of a display device capable of running an application (e.g., a smart phone, a tablet, a PDA, a laptop screen, a computer monitor, etc.), the cleaning may be triggered by the launching of a specific application or a command received during the execution of an application.

The construction and arrangement of the systems and methods as shown in the embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and/or assemblies of the enclosure may be constructed from any of a wide variety of materials that provide sufficient strength or durability, and in any of a wide variety of colors, textures, and combinations. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed:

1. A self-cleaning substrate system, comprising:
   a substrate;
   a cleaner coupled to the substrate, wherein the cleaner includes a coronal wind generator;
   a circuit configured to determine a characteristic of the substrate;
   a power source;
   a controller operatively coupled to the cleaner, the circuit, and the power source;
   wherein the circuit provides a feedback signal indicative of the detected characteristic to the controller, and wherein the controller is coupled to the cleaner such that the cleaner can be controlled by the controller.

2. The system of claim 1, wherein the cleaner includes a plurality of ultrasound emitters coupled to the power source, wherein the ultrasound emitters cause the substrate to experience localized vibrations by emitting ultrasonic waves into the substrate at a target area of the substrate.

3. The system of claim 2, further comprising a frame surrounding a periphery of the substrate.

4. The system of claim 3, wherein the plurality of ultrasound emitters are mounted to the frame.

5. The system of claim 4, further comprising a plurality of actuators, wherein each actuator is configured to move an individual ultrasound emitter of the plurality of ultrasound emitters linearly along the frame such that the plurality of ultrasound emitters are movable along the frame.

6. The system of claim 4, further comprising a plurality of rotary actuators, wherein each rotary actuator is configured to rotate an individual ultrasound emitter of the plurality of ultrasound emitters about the frame such that the plurality of ultrasound emitters are rotatable along the frame.

7. The system of claim 2, wherein the plurality of ultrasound emitters are coupled to a surface of the substrate.

8. The system of claim 1, wherein the cleaner comprises a plurality of cleaners including at least two types of cleaners selected from the group of electrodes, ultrasound emitters, and coronal wind generators.

9. The system of claim 1, further comprising an input coupled to the controller and configured to input cleaning instructions.

10. The system of claim 9, wherein the cleaning instructions include a raster scan pattern.

11. The system of claim 1, wherein the characteristic comprises an optical transmissiveness of the substrate.

12. The system of claim 1, wherein the substrate is part of a touchscreen display.

13. The system of claim 12, wherein the characteristic comprises user touch information.

14. A self-cleaning substrate system, comprising:
    a substrate;
    a plurality of ultrasound emitters coupled to the substrate, wherein the ultrasound emitters are arranged in an array along the substrate, the array having a plurality of rows of the ultrasound emitters and a plurality of columns of the ultrasound emitters;
a circuit configured to determine a characteristic of the substrate;
a power source; and
a controller operatively coupled to the plurality of ultrasound emitters mechanisms, the circuit, and the power source;
wherein the circuit provides a feedback signal indicative of the detected characteristic to the controller;
wherein the controller is coupled to each of the plurality of ultrasound emitters and is configured to individually activate and deactivate the ultrasound emitters based on the feedback signal to selectively clean a localized area of the substrate.

15. The system of claim 14, wherein the ultrasound emitters cause the substrate to experience localized vibrations by emitting ultrasonic waves into the substrate at the area of the substrate.

16. The system of claim 15, wherein the ultrasonic waves comprise surface acoustic waves.

17. The system of claim 14, wherein the controller is configured to selectively activate and deactivate the ultrasound emitters in a raster scan pattern to clean the area in a sequence of sweeps across the area of the substrate.

18. The system of claim 14, further comprising an input coupled to the controller and configured to input cleaning instructions.

19. The system of claim 18, wherein the cleaning instructions include a threshold level of the characteristic.

20. The system of claim 14, wherein the characteristic comprises a cleanliness of a site on the surface.

21. The system of claim 14, wherein the substrate is part of an electronic display.

22. The system of claim 21, wherein the characteristic comprises display-usage of a site on the display.

23. The system of claim 14, wherein the substrate is optically transmissive.

24. The system of claim 14, wherein the substrate is transparent.

25. A self-cleaning substrate system, comprising:
a substrate;
a frame surrounding a periphery of the substrate;
an ultrasound emitter coupled to the frame, wherein the ultrasound emitter is configured to emit ultrasonic waves into the substrate;
a rotary actuator configured to rotate the ultrasound emitter about the frame;
a circuit configured to determine a characteristic of the substrate;
a power source; and
a controller operatively coupled to the ultrasound emitter, the circuit, and the power source;
wherein the circuit provides a feedback signal indicative of the detected characteristic to the controller;
wherein the controller is configured to activate and deactivate the ultrasound emitter based on the feedback signal to selectively clean an area of the substrate.

26. The system of claim 25, wherein the ultrasound emitters cause the substrate to experience localized vibrations by emitting ultrasonic waves into the substrate at the area of the substrate.

27. The system of claim 25, further including a plurality of ultrasound emitters, wherein the controller is coupled to each of the plurality of ultrasound emitters, and wherein the controller is configured to individually activate and deactivate the plurality of ultrasound emitters.

28. The system of claim 27, further comprising a plurality of actuators, wherein each actuator is configured to move an individual ultrasound emitter of the plurality of ultrasound emitters linearly along the frame such that the plurality of ultrasound emitters are movable along the frame.

29. The system of claim 27, further comprising a plurality of rotary actuators, wherein each rotary actuator is configured to rotate an individual ultrasound emitter of the plurality of ultrasound emitters about the frame such that the plurality of ultrasound emitters are rotatable along the frame.

30. The system of claim 25, wherein the controller is configured to activate and deactivate the ultrasound emitter such that the area is cleaned in a scan pattern by performing a sequence of ultrasound sweeps across the area of the substrate.

31. The system of claim 25, further comprising an input coupled to the controller and configured to input cleaning instructions.

32. The system of claim 31, wherein the cleaning instructions include a threshold level of the characteristic.

33. The system of claim 25, wherein the characteristic comprises information concerning a previous cleaning of a site on the surface.

34. The system of claim 33, wherein the information comprises a quality of the previous cleaning.

* * * * *